US012775497B2

(12) United States Patent
Li

(10) Patent No.: US 12,775,497 B2
(45) Date of Patent: Oct. 27, 2026

(54) ESTIMATION OF MICROSERVICE SYSTEM CAPACITY

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 18/775,414

(22) Filed: Jul. 17, 2024

(65) Prior Publication Data

US 2026/0023608 A1 Jan. 22, 2026

(51) Int. Cl.
*G06F 9/50* (2006.01)

(52) U.S. Cl.
CPC .................................. *G06F 9/5027* (2013.01)

(58) Field of Classification Search
CPC ...... G06F 9/5027; G06F 9/5038; G06F 9/505; G06F 9/5066; G06F 9/5083
See application file for complete search history.

(56) References Cited

U.S. PATENT DOCUMENTS 9,628,380 B2 * 4/2017 Xia ........................ H04L 45/306
10,178,045 B2 * 1/2019 Kumar .................. H04L 47/826
10,892,937 B1 * 1/2021 Mukhopadhyaya .. G06F 16/284
11,204,961 B1 * 12/2021 Farber ..................... H04L 67/61
11,356,382 B1 * 6/2022 Goyal ..................... G06F 9/5022
11,797,282 B2 * 10/2023 Vecera .................... G06F 9/455
2008/0183544 A1 * 7/2008 Matsumitsu ............ G06F 9/505
705/7.26
2014/0059178 A1 * 2/2014 Dutta .................... H04L 41/145
709/219
2016/0156715 A1 * 6/2016 Larouche ............ H04L 67/1097
709/201
2016/0246652 A1 * 8/2016 Herdrich ............... G06F 9/5077
2016/0380846 A1 * 12/2016 Boerner .............. H04L 41/5009
709/224
2019/0166023 A1 * 5/2019 Hutchison ............. H04L 41/069
2020/0067800 A1 * 2/2020 Wang ....................... H04L 41/12
2020/0159591 A1 * 5/2020 Rudolph ............... H04L 67/562
2020/0366697 A1 * 11/2020 Vittal ...................... G06F 21/62
(Continued)

FOREIGN PATENT DOCUMENTS

CN 110083455 B * 7/2022 ............... G06F 8/60
CN 116795381 A * 9/2023 ............... G06F 8/60
(Continued)

*Primary Examiner* — Charles E Anya
(74) *Attorney, Agent, or Firm* — Buckley, Maschoff & Talwalkar LLC

(57) ABSTRACT

Systems and methods include determination, for each of a plurality of different types of requests, of a sequence in which services are executed in response thereto, generation of a directed graph based on the sequences s, where each vertex of the directed graph represents a service, generation of a flow network graph by splitting each vertex of the directed graph into two vertices with a directed edge between, and associated with a capacity of the service represented by the vertex, determination of a maximum flow through the service system based on the flow network graph, determination of a residual capacity of each service based on the maximum flow and its capacity of each service, determination of services associated with a zero residual capacity, and increasing of computing resources available to the determined services.

20 Claims, 14 Drawing Sheets

(56) References Cited

U.S. PATENT DOCUMENTS

| | | | | |
|---|---|---|---|---|
| 2021/0216291 | A1* | 7/2021 | White | G06F 8/433 |
| 2022/0398073 | A1* | 12/2022 | Chopra | G06F 8/65 |
| 2023/0114682 | A1* | 4/2023 | Bharti | H04W 48/18 370/392 |
| 2023/0232195 | A1* | 7/2023 | Biswas | G06F 9/45558 370/230 |
| 2024/0069975 | A1* | 2/2024 | Sheng | G06F 9/505 |
| 2025/0156227 | A1* | 5/2025 | Pittner | G06F 9/5055 |

FOREIGN PATENT DOCUMENTS

| | | | | | |
|---|---|---|---|---|---|
| IE | 3226134 | B1 | * | 2/2021 | G06F 9/50 |
| JP | 2022114776 | A | * | 8/2022 | G06F 9/50 |

* cited by examiner

600

| Service | Capacity |
|---|---|
| s1 | 5000 |
| s2 | 4000 |
| s3 | 6000 |
| s4 | 7000 |
| s5 | 8000 |
| s6 | 4500 |
| s7 | 3500 |
| s8 | 4200 |
| s9 | 6100 |
| s10 | 5700 |
| s11 | 6300 |
| s12 | 7400 |

*FIG. 6*

1300

| Service | Capacity |
|---|---|
| s1 | 5000 |
| s2 | 4000 |
| s3 | 6000 |
| s4 | 5000 |
| s5 | 6000 |
| s6 | 6000 |
| s7 | 3500 |
| s8 | 5200 |
| s9 | 7600 |
| s10 | 4700 |
| s11 | 5300 |
| s12 | 6400 |

FIG. 13

ESTIMATION OF MICROSERVICE SYSTEM CAPACITY

BACKGROUND

A microservice-based application consists of distinct functions implemented using independent microservices deployed within a microservice system. Each microservice is independently accessible and executes in its own computing process in a separate computing system (e.g., server/virtual machine/container). Many requests directed to a microservice-based application are processed using several microservices of the microservice system.

Microservices are often implemented in the cloud in order to leverage the redundancy, economies of scale and other benefits provided by cloud platforms. One such benefit is resource elasticity, which allows the computing resources (e.g., CPU power, memory size, and network bandwidth) consumed by a microservice to be efficiently scaled up and scaled down according to the needs of the microservice. For example, as CPU usage, memory usage, and/or RPS (incoming requests per second) of a microservice increase beyond a threshold, additional resources may be allocated to the microservice. Similarly, resources may be deallocated from the microservice if CPU usage, memory usage, and/or RPS decrease below a given threshold. Resource costs for operating the microservice may be thereby reduced in comparison to systems in which resources are fixedly allocated to serve a maximum anticipated workload.

Resources may be allocated to or deallocated from a microservice based on the capacity of the microservice. The capacity of a single microservice may be estimated by performing load tests during development. The capacity of a microservice is limited by many factors, such as its allocated CPU/memory/disk/network bandwidth.

On the other hand, it is difficult to accurately estimate the capacity of all individual microservices during productive use within a microservice system, hereinafter referred to as the microservice system capacity. The microservice system capacity may indicate where processing bottlenecks might occur and where resources may be over-allocated. Estimating the microservice system capacity is difficult due at least in part to the typically complex relationships between the microservices of the microservice system and the difficulty of simulating productive traffic levels while also monitoring and analyzing the health status of each microservice.

Knowledge of the microservice system capacity may assist in the distribution of hardware/software resources within a microservice system. Systems are desired for efficiently estimating the capacity of a microservice system.

BRIEF DESCRIPTION OF THE DRAWINGS

FIG. 6 is a tabular representation of microservice capacities according to some embodiments.

FIG. 13 is a tabular representation of microservice capacities according to some embodiments.

DETAILED DESCRIPTION

The following description is provided to enable any person in the art to make and use the described embodiments. Various modifications, however, will remain readily-apparent to those in the art.

Some embodiments facilitate estimating the capacity of a microservice system. A microservice system may serve different types of requests and provide responses thereto. To provide such responses, the request is received and instructions are executed on data and with conditions in a structured manner also known as workflow. In other words, the workflow is the sequence of events that provide a response to a request. The execution or carrying-out of a particular type of workflow may require execution of a particular sequence of microservices, while serving another type of workflow may require execution of a different sequence of microservices. The sequences may include the same or different microservices.

Embodiments may operate to determine a sequence of microservices which is executed in response to each of several different types of requests that may require different workflows in order to generate the correct response. A directed graph is generated based on the sequences, where each vertex of the directed graph represents a microservice. To represent the ability of a microservice to conduct data executions, such as amount of CPUs available, amount of memory available, etc., a throughput of each microservice is created for a flow network graph by splitting each vertex of the directed graph into two vertices with a directed edge between, where the directed edge is weighted based on the workload capacity of the service represented by the vertex. A capacity of the microservice system is determined based on the flow network graph, a residual capacity graph is determined based on the capacity and the flow network graph, and microservices which are associated with residual capacity are determined based on the residual capacity graph. Embodiments may then operate to decrease resources available to the microservices which are associated with residual capacity and/or increase resources available to the microservices which are not associated with residual capacity. As a result, a more efficient allocation of resources may be achieved.

Figure 1:
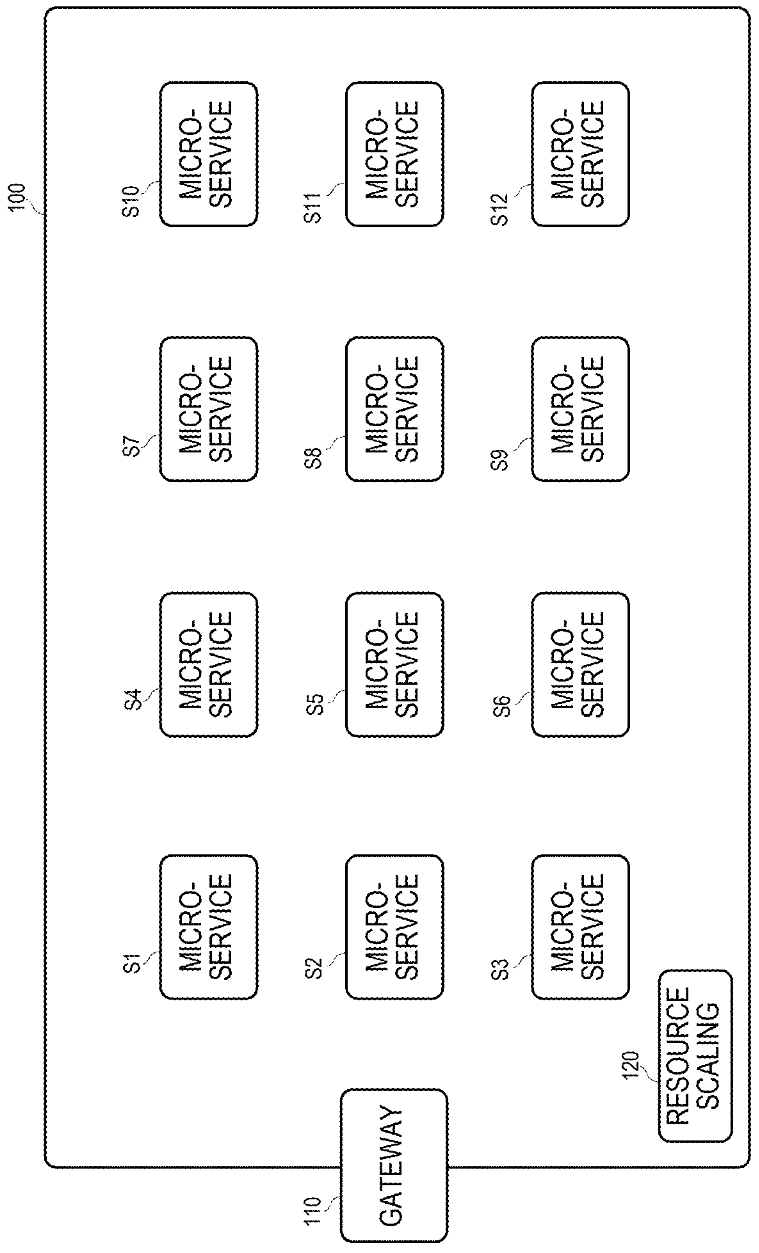
FIG. 1 illustrates a microservice system according to some embodiments.

FIG. 1 illustrates a system according to some embodiments. Each of the illustrated components may be implemented using any suitable combination of local, on-premise, cloud-based, distributed (e.g., including distributed storage and/or compute nodes) computing hardware and/or software that is or becomes known. Each component described herein may be executed by one or more physical and/or virtualized servers providing an operating system, services, I/O, storage, libraries, frameworks, etc. In some embodiments, two or more components are implemented by a single server.

One or more components may be implemented by a cloud service (e.g., Software-as-a-Service, Platform-as-a-Service). A cloud-based implementation of any components of FIG. 1 may apportion computing resources elastically according to demand, need, price, and/or any other metric. A cloud-based implementation may utilize a container orchestration platform such as but not limited to Kubernetes. Kubernetes is an open-source system for automating deployment, scaling, and management of containerized applications.

Microservice system 100 includes microservices S1 through S12. Microservices S1 through S12 may be microservices of one or more microservice-based applications. The applications may comprise single and/or multi-tenant applications. The present description uses the term microservices to generally include microservices, services, applications, and any other independently-executable computing system-provided functionality.

Each of microservices S1 through S12 may be provided by a separate execution environment (e.g., a separate process in a separate computing system). Microservices S1 through S12 may communicate with one another and with other unshown microservices using lightweight network communication mechanisms such as a resource Application Programming Interface (API) via Hyper Text Transfer Protocol (HTTP) request-response messages, but embodiments are not limited thereto.

Microservice system 100 receives incoming requests from external clients. For example, gateway 110 receives a request (e.g., an API call) associated with an application provided by microservice system 100 from a client device. Gateway 110 determines a microservice of the microservice-based application to which the request should be forwarded depending on the type of the request. The microservice receives the request and executes corresponding processing which may include calling another microservice of microservice system 100. The called microservice may in turn call another microservice of microservice system 100, and so on until a response to the initial request is returned, which may rely upon intervening or intermediate responses from microservice-to-microservice requests.

Resource scaling component 120 may determine a capacity of system 100 as described herein. The determination may be based on individual capacities of microservices S1 through S12. The individual capacities may be computed based on the resources of the respective microservices S1 through S12 or via testing, for example. Resource scaling component 120 may determine the individual capacities via a monitoring function in some embodiments. The individual capacities may be represented as a number of requests per second (RPS) but embodiments are not limited thereto.

Resource scaling component 120 may also determine re-allocations of computing resources among microservices S1 through S12 based on the determined capacity of system 100. In some embodiments, resource scaling component 120 may also or alternatively initiate the determined re-allocation of computing resources The re-allocation may be performed in any manner that is or becomes known. Cloud environments generally provide systems to elastically allocate computing resources to virtual machines based on demand. Microservices S1 through S12 may also be deployed in containers managed by a container orchestration platform which provides efficient autoscaling.

For example, each microservice S1 through S12 may be deployed using a plurality of pods, each of which independently provides an instance of its microservice. Each pod is a collection of one or more containers and runs on a virtual or a physical machine (i.e., a node) which may execute multiple pods. Resources may be allocated to or de-allocated from the microservice by adjusting the number of pods, the number of nodes and/or the computing resources of each node.

Figure 2:
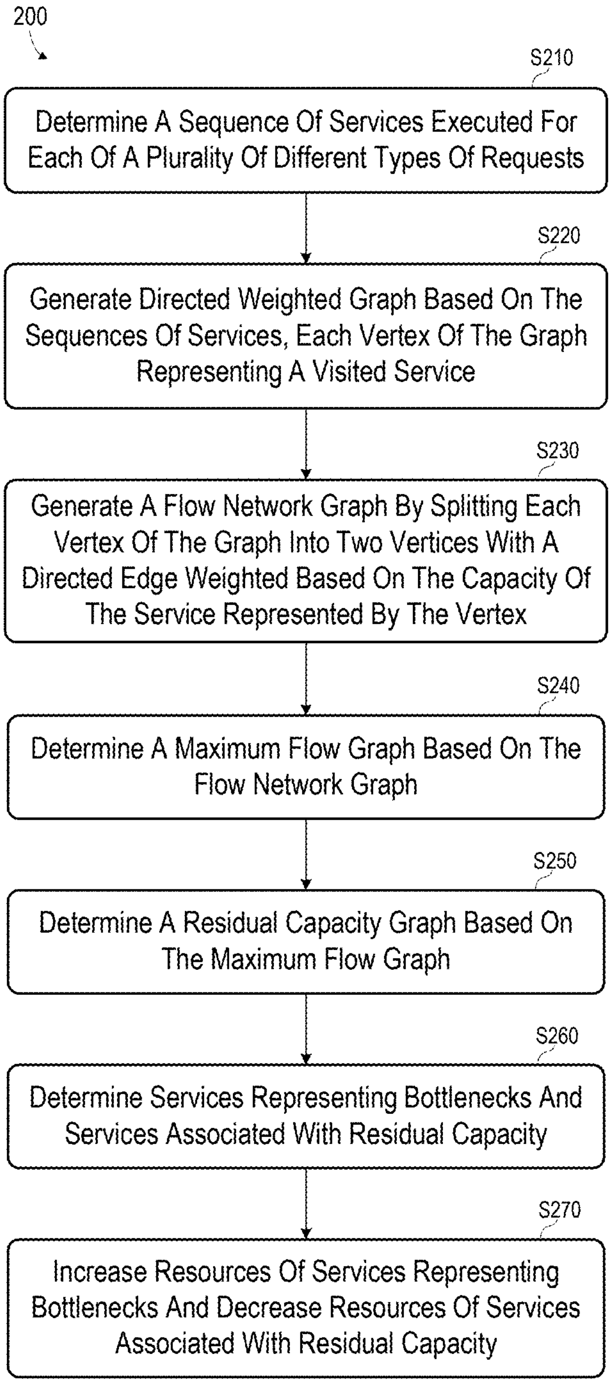
FIG. 2 is a flow diagram of a process to estimate the capacity of a microservice system according to some embodiments.

FIG. 2 is a flow diagram of process 200 to estimate the capacity of a microservice system according to some embodiments. Process 200 and the other processes described herein may be performed using any suitable combination of hardware and software. Program code embodying these processes may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Figure 3:
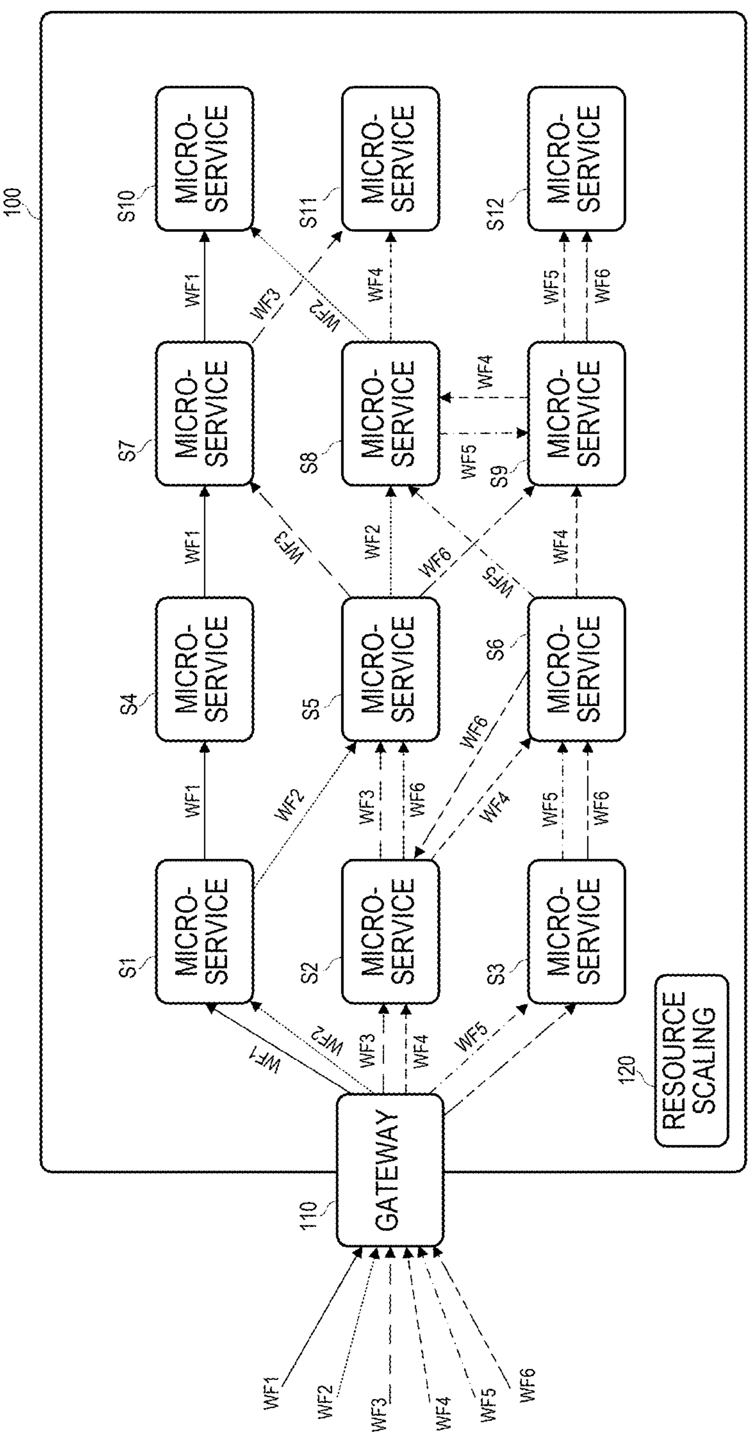
FIG. 3 illustrates a sequence of microservices for each of a plurality of workflows within a microservice system according to some embodiments.

A sequence of services, or flow or workflow, to be executed for each of a plurality of request types is determined at S210. FIG. 3 depicts sequences of services, or workflows, to be executed for each of different types of requests. Although six workflows are depicted in FIG. 3, microservice system 100 may implement one or more applications, each of which is responsive to any number of types of requests.

As shown, a request of a given request type is received by gateway 110 and, in response, a sequence of services (i.e., flow or workflow) for that request type is executed. The sequences and the service executed in each sequence may differ among request types. For example, gateway 110 routes an incoming request of type WF1 to microservice S1. For clarity in FIG. 3, all intermediate requests that are part of an individual workflow will share the same suffix integer (e.g., 1) after the prefix WF. Microservice S1 executes or performs corresponding processing on the initial request received from gateway 110 and calls microservice S4. Microservice S4 then executes or performs processing on the request from S1, which may include all or a portion of the initial request, and calls microservice S7, which executes and calls microservice S10. Responses to the calls are returned through the microservices and a final response is returned to gateway 110.

It should be noted that responses to initial and intermediate requests are not shown in FIG. 3 for clarity. However, the responses to initial and intermediate requests can be represented by the shown arrows (e.g., the arrow WF1 from S1 to S4 is representative of the intermediate request issued from S1 to S4 as well as the response to that request issued from S4 to S1) or other responses could have been added to this figure without departing from the scope of the description herein (e.g., a final response to the initial request WF1 from gateway 110 to S1 could be added from S10 to gateway 110 wherein that response is then forwarded to the requestor who issued the request WF1 to gateway 110).

An incoming request of type WF2 is also routed from gateway 110 to microservice S1. However, unlike incoming requests of type WF1, processing of the request of type WF2 by microservice S1 includes calling microservice S5. Microservice S5 executes or performs corresponding processing on the request received from S1 and calls microservice S8.

A particular microservice may be used in the generation of a response to one or more types of requests. Moreover, a first microservice may call a second microservice during generation of a response to a request of a first type, while the second microservice may call the first microservice during generation of a response to a request of a second type. See, e.g., microservices S8 and S9.

Next, at S220, a directed weighted graph is generated based on the sequence of services determined for each request type, where each vertex of the directed weighted graph represents a visited service. The directed weighted graph includes a directed edge which represents a capacity from the vertex representing a calling service to the vertex representing the called service. Multiple calls in the same direction between the same services are represented by a single edge. Initially, each edge is weighted with a value of infinity or other sufficiently high value so as not to unnecessarily impact the determinations as will be described later.

Figure 4:
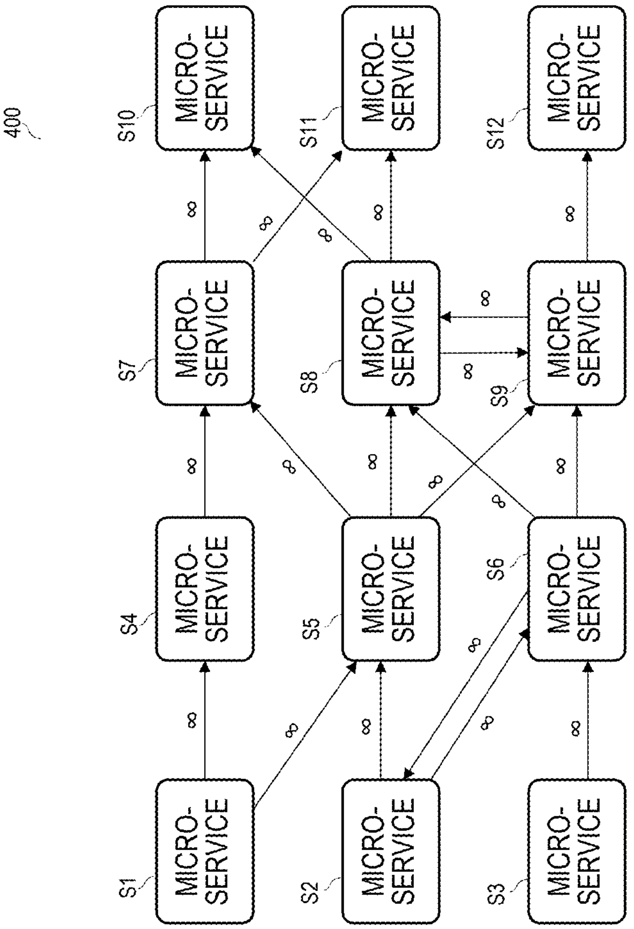
FIG. 4 illustrates a directed weighted graph according to some embodiments.

FIG. 4 shows directed weighted graph 400 based on the sequences shown in FIG. 3. In particular, FIG. 4 focuses on the respective capacities to process intermediate requests between services S1 through S12 and therefore omits the initial capacities of requests from gateway 110 to services S1, S2 and S3. Also, as noted above, any capacity for intermediate responses to the intermediate requests may either be added or may be incorporated into the edges shown in FIG. 4.

Directed weighted graph 400 includes twelve vertices, each of which represents one of microservices S1-S12. The capacity to support multiple calls between services S2 and S5, and S3 and S6 are each represented by one edge of graph 400. In contrast, the capacity to support multiple calls between microservices S8 and S9, and S2 and S6 are represented by separate edges since they occur in opposite directions.

FIG. 4 does not include a singular source vertex nor a singular sink vertex for the weighted directed graph 400. According to some embodiments, other directed weighted graphs could include a singular source vertex and a singular sink vertex. Gateway 110 may represent a source vertex, with its capacity for outgoing calls represented by directed edges as described above.

Figure 5:
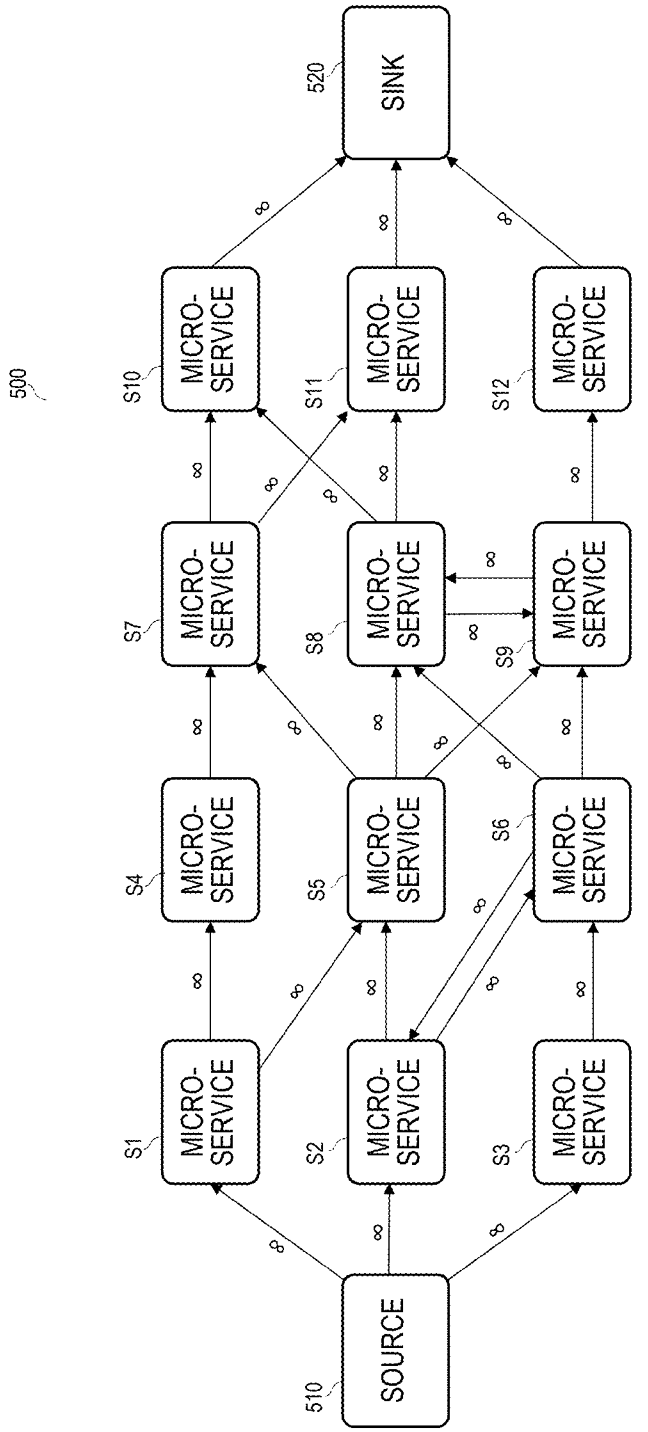
FIG. 5 illustrates a directed weighted graph including source and target vertices according to some embodiments.

Some microservices do not issue requests to other microservices (e.g., S10, S11 and S12). To facilitate the foregoing computation, a, virtual singular sink vertex can be added. The singular sink vertex does not represent any existing service. Edges are created from the last service of every workflow sequence to the sink vertex. As shown in FIG. 5 directed weighted graph 500 includes source vertex 510 and sink vertex 520, with edges from microservices S10, S11 and S12 to sink vertex 520. In some implementations, gateway 110 may be represented by the source node 510 as well as the sink node 520, but, for purposes of computation, a source node 510 separate from sink node 520 is used.

At S230, each vertex of the graph is split into two vertices with a directed edge from an input vertex to an output vertex. Moreover, the directed edge is weighted based on the capacity of the service represented by the original vertex. FIG. 6 shows table 600 according to some embodiments. Table 600 provides the capacity of each service of microservice system 100. The capacity is the amount any service, or edge, can process or transmit. Any additional demand for processing or transmission beyond the stated capacity will not be executed efficiently and will have to wait until earlier-initiated processes or transmissions are finished (e.g., a bottleneck). The capacities are provided in units of RPS, but embodiments are not limited thereto and could include some combination of available CPU or memory resources, I/O resources, etc. The capacity of each service may be determined based on the resources allocated to the service, testing results and/or by any other methods. As such, the values shown in FIG. 6 may be collected from microservice system 100 periodically to determine the overall thereof and the adjustments can be made to microservice system 100 following the descriptions provided herein.

Figure 7:
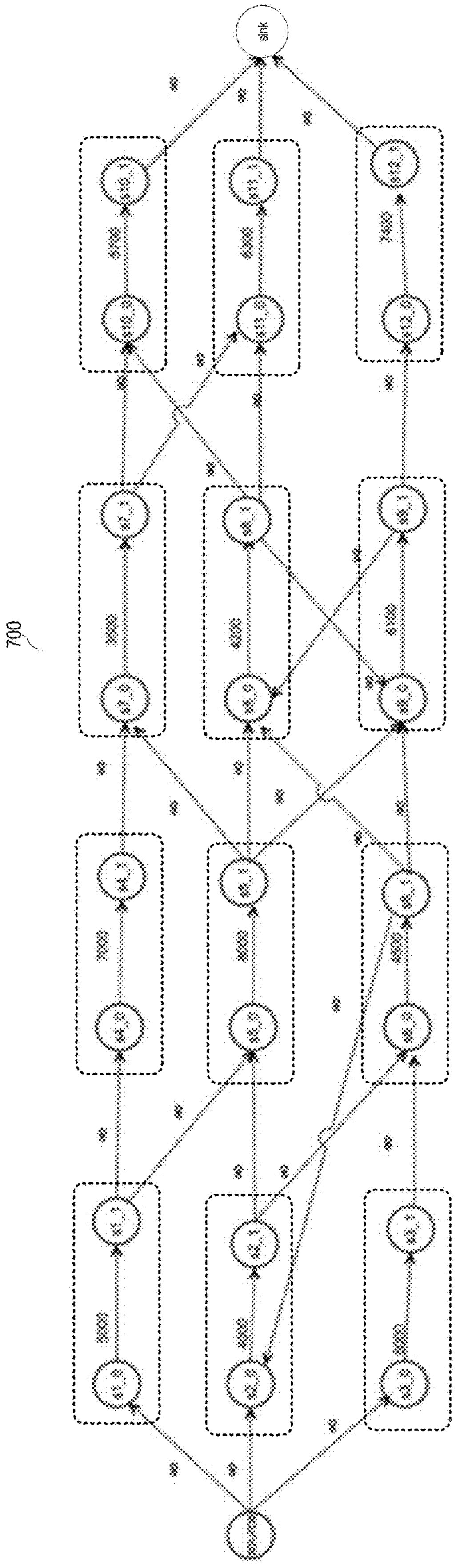
FIG. 7 illustrates a flow network graph according to some embodiments.

FIG. 7 illustrates graph 700 after splitting of the vertices at S230. The edges between split vertices S #_0 and S #_1 are weighted with the capacity of service S #, and the other edges remain weighted at infinity or other suitably high value. Leaving the original edges first shown in FIGS. 4 and 5 at infinity or a sufficiently high value, the further determinations made in FIG. 2 are focused on the weighted edges between the split vertices S #_0 and S #_1. This allows for determinations which are more focused on the throughput of each service based on the capacity therein (e.g., available resources) to each service and less focused on the bandwidth constraints between the individual services S1-S12.

In other implementations, the bandwidth between the individual services S1-S12 can be accounted for in the values attributed to the split vertices as shown in FIG. 6. In many computer software implementations, the use of infinity is not possible, and, in these situations, a suitably large number is assigned to the edges between different microservice edges instead of infinity. There are many ways to arrive at such a sufficiently large number such as taking the largest number shown in FIG. 6 and multiplying by a factor (e.g., 20) or adding all of the capacities shown in FIG. 6 together and multiplying that sum by a factor (e.g., 4). For the sake of clarity, FIGS. 7, 9, 10, 11 and 12 will use the symbol for infinity instead of a sufficiently large number.

Graph 700 is considered a flow network graph in some embodiments. A flow is an amount of throughput through or resources used at a particular service or vertex and it cannot be greater than that service's or vertex's capacity.

Next, at S240, the maximum flow of the flow network graph is determined. It should be noted that a maximum flow is associated with the maximum flow through the entire graph 700, and thereby the corresponding microservice system 100 of FIGS. 1 and 3. Accordingly, some individual workflows shown in FIG. 3 may be operating at maximum throughput, but other individual workflows may be operating at less than maximum throughput for the resources allocated to each service. That is, some workflows may operate at below maximum throughput so that other workflows may operate at a higher throughput to achieve an overall system that is operating at its maximum throughput. A more optimal flow through microservice system 10 may be achieved by reallocating resources between different services, but this reallocation may still result in some services, and thereby some workflows, operating at below their maximum throughput.

The maximum flow may be determined at S240 based on flow network theory according to some embodiments. A brief description of the maximum flow problem follows, in which N=(V, E) is a network with s, t∈V being the source and sink of N, respectively, and g is a function on the edges of N and its value on (u, v)∈E is g(u, v).

The capacity of an edge is the maximum amount of flow that can pass through the edge (i.e., c: $E \rightarrow \mathbb{R}^+$). A flow is a map f: $E \rightarrow \mathbb{R}$ in which the flow of an edge cannot exceed its capacity. Stated differently, $f_{uv} \leq c_{uv}$ for all (u, v)∈E. Moreover, except for the source and the sink, the sum of the flows entering a node must equal the sum of the flows exiting that node.

The value of flow within the network is the amount of flow passing from the source to the sink. A determination of maximum flow seeks to find the flow $f_{max}$ which represents the maximum possible flow from the source to the sink. Various algorithms for determining the maximum flow exist, such as but not limited to the Ford-Fulkerson algorithm, the Edmonds-Karp algorithm, and Dinic's algorithm.

Figure 8:
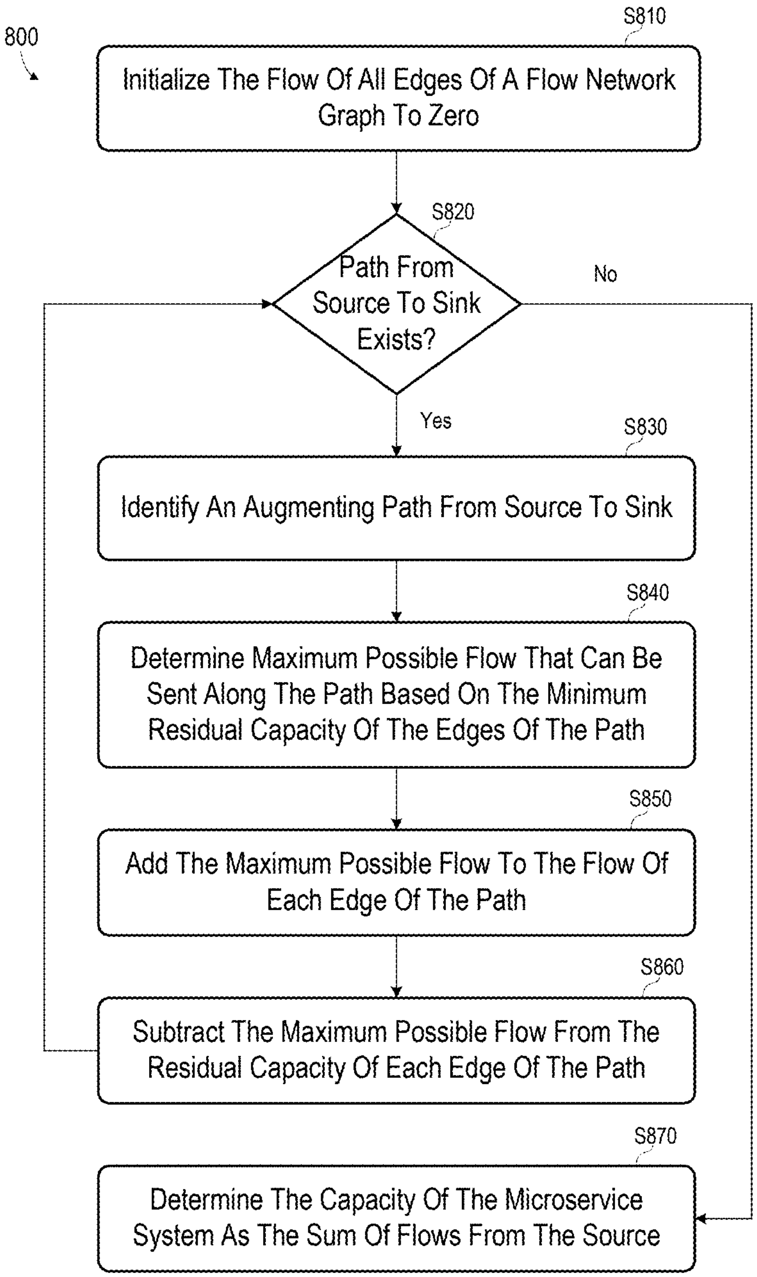
FIG. 8 is a flow diagram of a process to determine a maximum flow graph from a flow network graph according to some embodiments.

FIG. 8 is a flow diagram of process 800 to determine a maximum flow graph from a flow network graph at S240 according to some embodiments. Process 800 may comprise an implementation of the Ford-Fulkerson algorithm in some embodiments.

Figure 9:
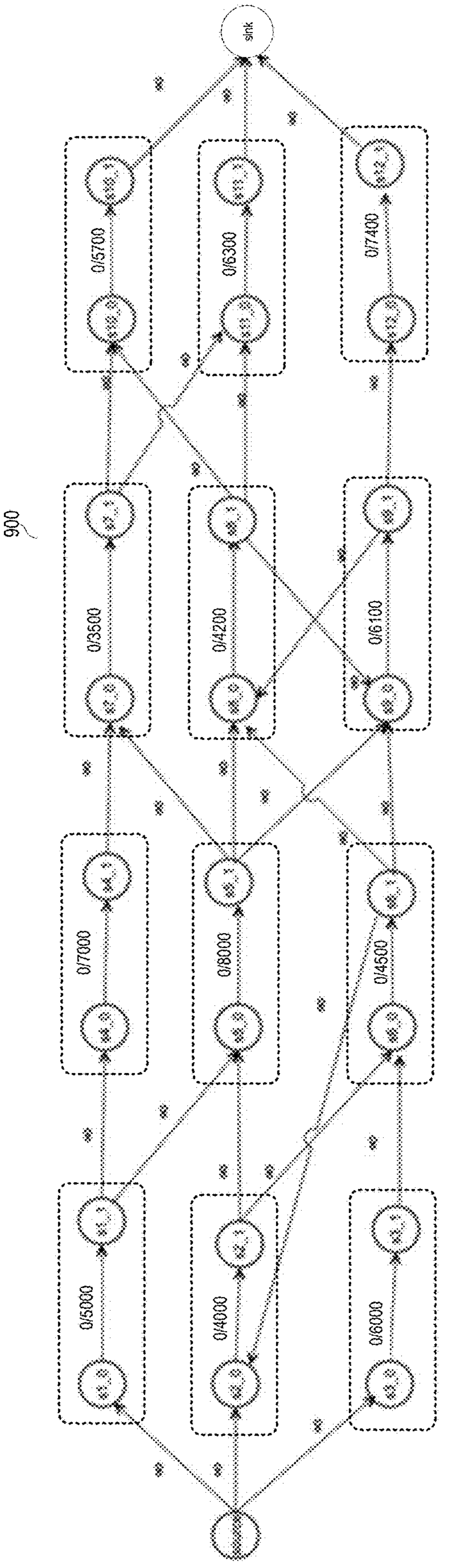
FIG. 9 illustrates an updated flow network graph according to some embodiments.

At S810, the flows of all edges of a flow network graph are set to a weight of zero. FIG. 9 illustrates network graph 900 as updated to represent the flow and capacity of each service by labelling the directed edge of the service with <flow>/<residual capacity>, and with each flow term set to zero. Next, it is determined at S820 whether the flow network graph includes a directed path from the source to the sink. If so, an augmenting path from the source to the sink is identified at S830. The augmenting path may be identified using a depth-first search, a breadth-first search, etc.

Figure 10:
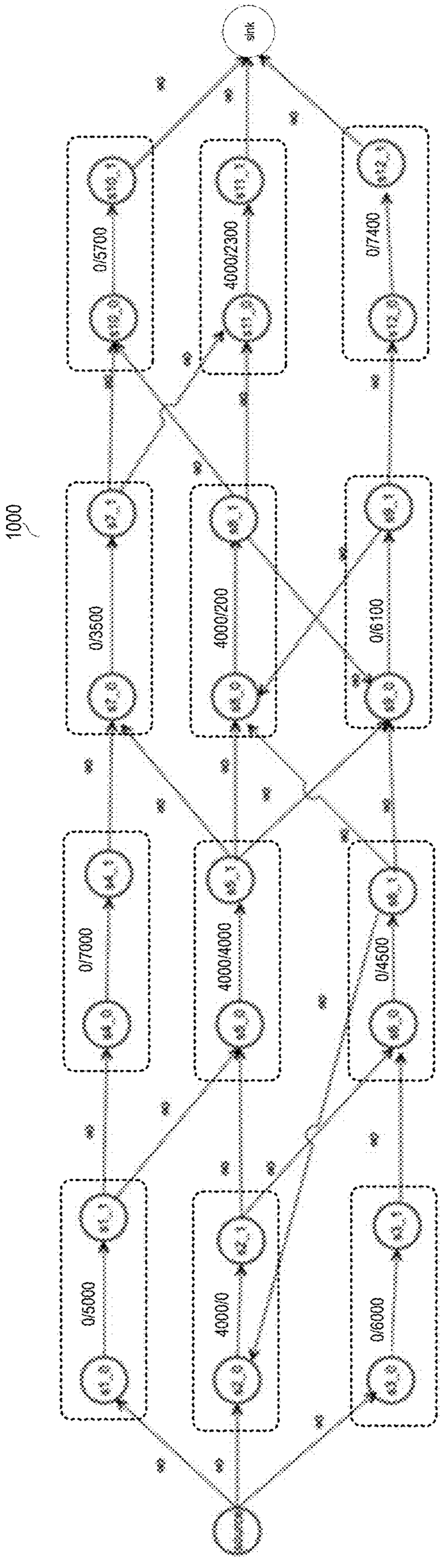
FIG. 10 illustrates an updated flow network graph according to some embodiments.

At S840, the maximum possible flow that can be sent along this path is determined. The maximum possible flow may be determined by finding the minimum residual capacity of the edges in the path. For example, given the path from source to S2 to S5 to S8 to S11 to sink, the minimum residual capacity (i.e., the difference between a service's capacity and flow) is (4000–0)=4000, corresponding to service S2. Next, at S850, the maximum possible flow for the identified augmenting path is added to the flow values along the path. Similarly, at S860, the maximum possible flow is subtracted from the residual capacity of each edge. FIG. 10 illustrates updated flow network graph 1000 in which 4000 has been added to the <flow> values and has been subtracted from the <residual capacity> values.

Figure 11:
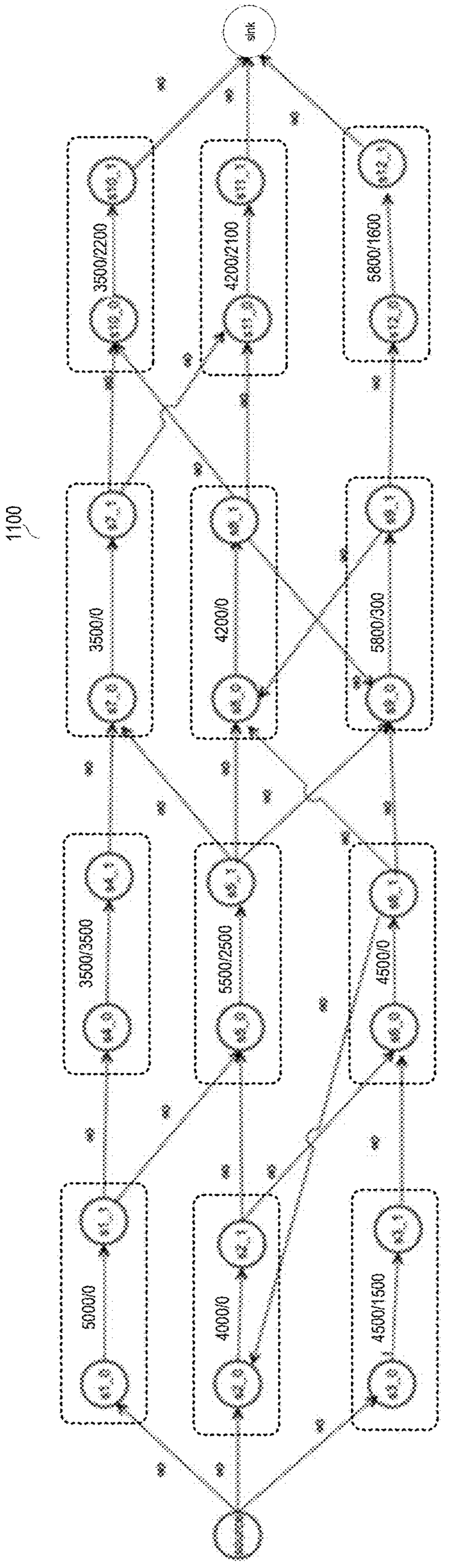
FIG. 11 illustrates a maximum flow graph according to some embodiments.

Process 800 then returns to S820 to determine whether any other paths from the source to the sink exist in which all services have a residual capacity>0. Process 800 therefore iterates over S830, S840, S850 and S860 until no such paths from the source to the sink remain. FIG. 11 illustrates maximum flow graph 1100 with <flow>/<residual capacity> values for each edge as they exist once it is determined at S820 that no other paths with residual capacity from the source to the sink exist.

Flow then proceeds from S820 to S860. At S860, the capacity of the microservice system is determined based on the maximum flow graph. According to some embodiments, the capacity is determined as the sum of all flows leaving the source. In the present example, the sum of all flows leaving the source is 5000+4000+4500=13500.

Returning to process 200, a residual capacity graph is determined based on the maximum flow graph at S250. As mentioned above, the edges of the maximum flow graph are labeled <flow>/<residual capacity>. The residual capacity of an edge is the difference between the edge's capacity and its flow from the maximum flow graph. The residual capacity graph includes the <residual capacity> values of each edge from the maximum flow graph but omits edges with a residual capacity=0.

Figure 12:
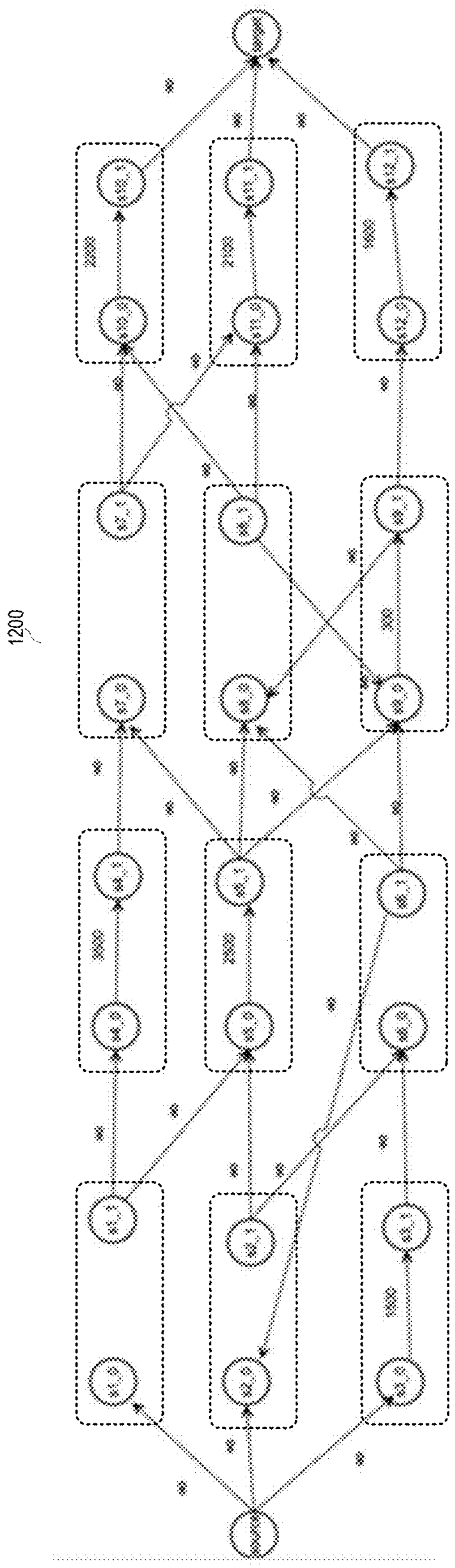
FIG. 12 illustrates a residual capacity graph according to some embodiments.

FIG. 12 illustrates residual capacity graph 1200 according to some embodiments. Edges having non-zero integer values represent services with excess capacity. The excess capacity results from flow limits imposed by the capacity of the downstream services.

Services representing bottlenecks and services associated with residual capacity are determined at S260. A bottleneck is the minimum residual capacity of all the edges in a given source-to-sink path. The flow network is at maximum flow only if it includes a bottleneck with a value of zero. For example, it is determined at S260 that microservices S6, S8, S9 are the bottlenecks of the system (i.e., assuming that entrance microservices S1, S2, S3 have been configured to an optimum state of resource utilization). Moreover, it is determined at S260 that microservice S3 has a residual capacity of 1500, microservice S4 has a residual capacity of 3500, microservice S5 has a residual capacity of 2500, microservice S9 has a residual capacity of 300, microservice S10 has a residual capacity of 2200, microservice S11 has a residual capacity of 2100, and microservice S12 has a residual capacity of 1600.

At S270, resources of services representing bottlenecks are increased and resources of services associated with residual capacity are decreased. For example, to fully utilize the residual capacity of S3, resources may be added to service S6 to increase its capacity by 1500, and resources may be added to services S8 and S9 and increase their combined capacities by 1500. As a result of these changes, the maximum flow is 5000+4000+6000=15000, and the full capacities of entrance services S1, S2, S3 are utilized.

Service S4 has a residual capacity of 3500 and service S5 has a residual capacity of 2500. Resources allocated to these services may be decreased to reduce their residual capacity. Service S10 has a residual capacity of 2200, service S11 has a residual capacity of 2100, and service S12 has a residual capacity of 1600. The resources allocated to these services may also be decreased, but while ensuring that their resulting capacities can bear the new flow of service S3 (i.e., 1500).

Resources may be allocated to or de-allocated from a service in any suitable manner, including but not limited to changing a cloud configuration, adding or removing Kubernetes pods, etc. FIG. 13 illustrates table 1300 of microservice capacities after S270 according to some embodiments. Compared to table 600 of FIG. 6, the resources available to services S6, S8 and S9 have been increased to increase their capacities as described above, while the resources available to services S4, S5, S10, S11 and S12 have been decreased.

There are additional ways in which resources may be reallocated. Not every request can necessarily be processed in equal time. More complex requests may take more time to process than simpler requests. In other words, some services may see a different ratio of added resources (e.g., CPU units, memory units) to increased throughput (e.g., requests per second). As an example, adding or subtracting a CPU unit or core to a first service may yield an increased or decreased capacity change of 1000 RPS, respectively, while the addition or subtraction of a single CPU unit or core to a different service may only yield a change of 500 RPS. Thus, additional resources can be reallocated using a resource-to-throughput ratio.

In addition, resources can be reallocated with respect to specific workflows. As shown in FIG. 3, the initiating service of workflows WF1, WF2, WF3 and WF4 is either service S1 or service S2. From FIG. 12, resources are suggested for reallocation such that services S1, S2 and S7 would be operating at maximum throughput (e.g., they do not have any excess resources). Workflows WF1 and WF3 utilize service S7 while the other workflows WF2, WF4, WF5 and WF6 do not. Under the assumption that services S1 and S2 cannot receive additional resources to increase their respective capacities, perhaps constrained by limitations imposed by gateway 110, it is therefore possible that increasing the resources to service S7 may not yield increased throughput to workflows WF1 and WF3 as those workflows may already be limited by the services S1 and S2, respectively. In contrast, increasing resources to services S6 and S8 may improve the throughputs of workflows WF5 and WF6 as those two workflows have an initial service with extra capacity (e.g., service S3) and have downstream services S6 and S8 acting as bottlenecks.

Figure 14:
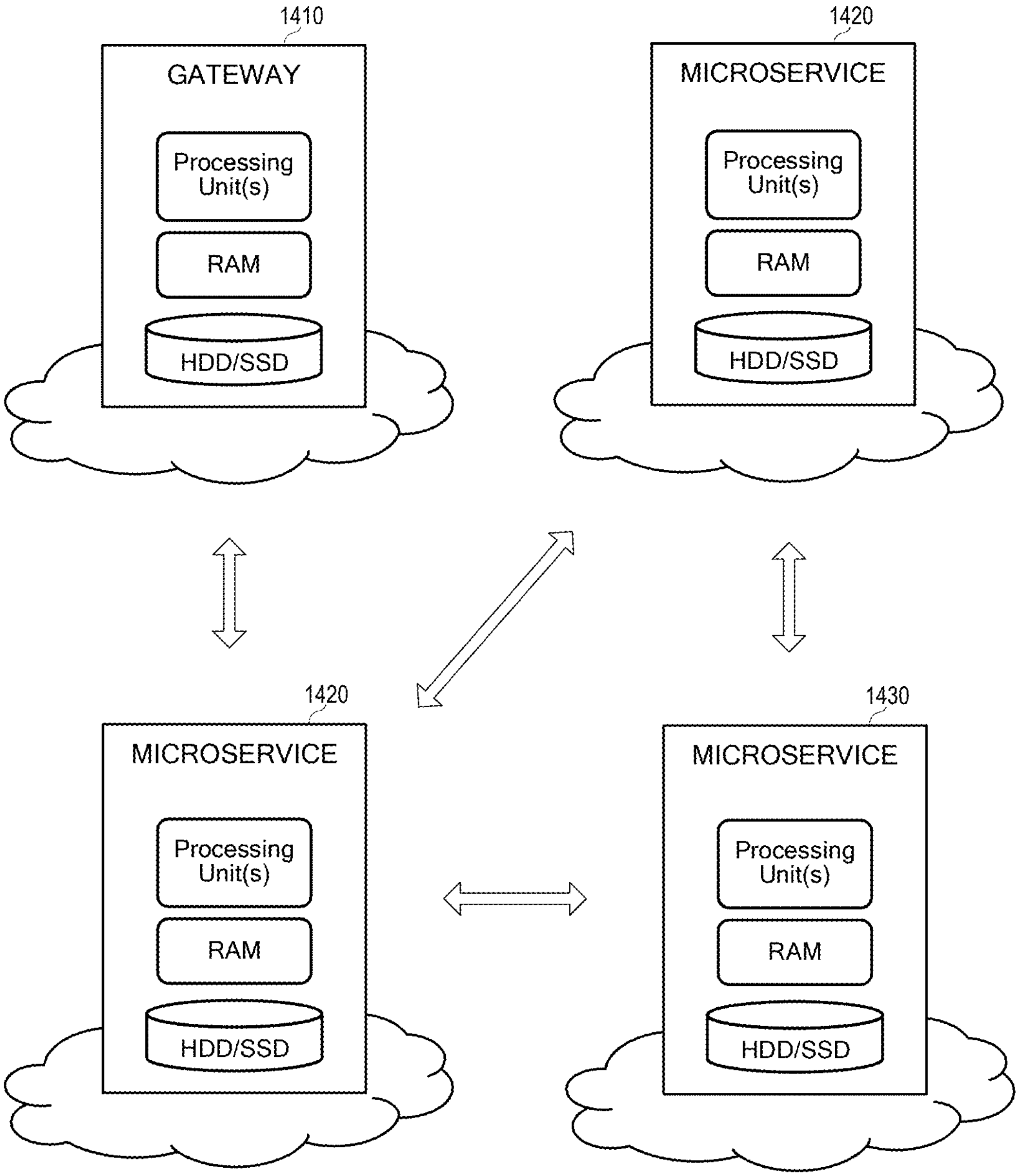
FIG. 14 illustrates a cloud-based architecture according to some embodiments.

FIG. 14 illustrates a cloud-based deployment according to some embodiments. The illustrated components may comprise cloud-based compute resources residing in one or more public clouds providing self-service and immediate provisioning, autoscaling, security, compliance, and identity management features.

Execution environments 1410-1440 may comprise servers or virtual machines of a Kubernetes cluster. Execution environments 1410-1440 may support containerized applications which provide one or more services to users. Execution environment 1410 may execute a gateway such as gateway 110 and execution environments 1420-1440 may execute microservices of a microservice-based application as described herein.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of networks and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:

a memory storing executable program code; and one or more processing units to execute the executable program code to cause the system to:

determine, for each of a plurality of different types of requests, a sequence in which services of a service system are executed in response, where a first one of the determined sequences executed in response to a first type of request is different from a second one of the determined sequences executed in response to a second type of request;

generate a directed graph based on the sequences of services, where each vertex of the directed graph represents a service of the services;

generate a flow network graph by splitting each vertex of the directed graph into two vertices with a directed edge between, the directed edge associated with a weight representing a capacity of the service represented by the vertex;

determine a maximum flow through the service system based on the flow network graph;

determine a residual capacity of each service of the service system based on the maximum flow and the capacity of each service;

determine one or more services associated with a non-zero residual capacity based on the determined residual capacities; and decrease computing resources available to the one or more services associated with a non-zero residual capacity.

2. The system of claim 1, the one or more processing units to execute the executable program code to cause the execution environment to: determine a second one or more services associated with a zero residual capacity based on the determined residual capacities; and increase computing resources available to the second one or more services associated with a zero residual capacity.

3. The system of claim 2, wherein determination of the maximum flow through the service system comprises:

identification of a first path of services from a source of the flow network graph to a sink of the flow network graph;

determination of a first minimum capacity of the services of the first path; association of a first flow with the services of the first path based on the first minimum capacity;

for each service of the first path, subtraction of the first minimum capacity from the capacity of the service and assignment of the difference as the residual capacity of the service;

identification of a second path of services from the source of the flow network graph to the sink of the flow network graph;

determination of a second minimum capacity of the services of the second path;

association of a second flow with the services of the second path based on the second minimum capacity; and for each service of the second path, subtraction of the second minimum capacity from the capacity of the service associated and assignment of the difference as the residual capacity of the service.

4. The system of claim 3, wherein determination of the maximum flow through the service system comprises:

identification of a third path of services from the source of the flow network graph to the sink of the flow network graph, wherein a service of the third path is also a service of the first path;

determination of a third minimum capacity of the services of the third path;

for the service of the third path which is also a service of the first path, determination that a first flow associated with the service of the third path is less than the third minimum capacity; and in response to the determination that the flow associated with the service of the third path is less than the third minimum capacity:

association of the third minimum capacity with the service of the third path; and subtraction of a difference between the third minimum capacity and the first minimum capacity from the assigned residual capacity of the service of the third path.

5. The system of claim 1, wherein determination of the maximum flow through the service system comprises:

identification of a first path of services from a source of the flow network graph to a sink of the flow network graph;

determination of a first minimum capacity of the services of the first path;

association of a first flow with the services of the first path based on the first minimum capacity;

for each service of the first path, subtraction of the first minimum capacity from the capacity of the service and assignment of the difference as the residual capacity of the service;

identification of a second path of services from the source of the flow network graph to the sink of the flow network graph;

determination of a second minimum capacity of the services of the second path;

association of a second flow with the services of the second path based on the second minimum capacity; and for each service of the second path, subtraction of the second minimum capacity from the capacity of the service associated and assignment of the difference as the residual capacity of the service.

6. The system of claim 5, wherein determination of the maximum flow through the service system comprises:

identification of a third path of services from the source of the flow network graph to the sink of the flow network graph, wherein a service of the third path is also a service of the first path;

determination of a third minimum capacity of the services of the third path;

for the service of the third path which is also a service of the first path, determination that a first flow associated with the service of the third path is less than the third minimum capacity; and in response to the determination that the flow associated with the service of the third path is less than the third minimum capacity:

association of the third minimum capacity with the service of the third path; and subtraction of a difference between the third minimum capacity and the first minimum capacity from the assigned residual capacity of the service of the third path.

7. The system according to claim 1, wherein the capacities of two or more of the services are different.

8. A method comprising:

determining, for each of a plurality of different types of requests, a sequence in which services of a service system are executed in response to the request;

generating a directed graph based on the sequences of services, where each vertex of the directed graph represents a service of the services;

generating a flow network graph by splitting each vertex of the directed graph into two vertices with a directed edge between, and associating the directed edge with a capacity of the service represented by the vertex;

determining a maximum flow through the service system based on the flow network graph;

determining a residual capacity of each service of the service system based on the maximum flow into each service and the capacity of each service;

determining a one or more services associated with a zero residual capacity based on the determined residual capacities; and increase computing resources available to the one or more services associated with a zero residual capacity.

9. The method of claim 8, further comprising:

determining a second one or more services associated with a non-zero residual capacity based on the determined residual capacities; and decreasing computing resources available to the second one or more services associated with a non-zero residual capacity.

10. The method of claim 9, wherein determining the maximum flow through the service system comprises:

identifying a first path of services from a source of the flow network graph to a sink of the flow network graph;

determining a first minimum capacity of the services of the first path;

associating a first flow with the services of the first path based on the first minimum capacity; for each service of the first path, subtracting the first minimum capacity from the capacity of the service and assignment of the difference as the residual capacity of the service;

identifying a second path of services from the source of the flow network graph to the sink of the flow network graph;

determining a second minimum capacity of the services of the second path;

associating a second flow with the services of the second path based on the second minimum capacity; and for each service of the second path, subtracting the second minimum capacity from the capacity of the service associated and assignment of the difference as the residual capacity of the service.

11. The method of claim 10, wherein determining the maximum flow through the service system comprises:

identifying a third path of services from the source of the flow network graph to the sink of the flow network graph, wherein a service of the third path is also a service of the first path;

determining a third minimum capacity of the services of the third path;

for the service of the third path which is also a service of the first path, determining that a first flow associated with the service of the third path is less than the third minimum capacity; and in response to determining that the flow associated with the service of the third path is less than the third minimum capacity:

associating the third minimum capacity with the service of the third path; and subtracting a difference between the third minimum capacity and the first minimum capacity from the assigned residual capacity of the service of the third path.

12. The method of claim 8, wherein determining the maximum flow through the service system comprises:

identifying a first path of services from a source of the flow network graph to a sink of the flow network graph;

determining a first minimum capacity of the services of the first path;

associating a first flow with the services of the first path based on the first minimum capacity;

for each service of the first path, subtracting the first minimum capacity from the capacity of the service and assignment of the difference as the residual capacity of the service; identifying a second path of services from the source of the flow network graph to the sink of the flow network graph;

determining a second minimum capacity of the services of the second path;

associating a second flow with the services of the second path based on the second minimum capacity; and for each service of the second path, subtracting the second minimum capacity from the capacity of the service associated and assignment of the difference as the residual capacity of the service.

13. The method of claim 12, wherein determining the maximum flow through the service system comprises:

identifying a third path of services from the source of the flow network graph to the sink of the flow network graph, wherein a service of the third path is also a service of the first path;

determining a third minimum capacity of the services of the third path;

for the service of the third path which is also a service of the first path, determining that a first flow associated with the service of the third path is less than the third minimum capacity; and in response to determining that the flow associated with the service of the third path is less than the third minimum capacity:

associating the third minimum capacity with the service of the third path; and subtracting a difference between the third minimum capacity and the first minimum capacity from the assigned residual capacity of the service of the third path.

14. The method according to claim 8, wherein the capacities of two or more of the services are different.

15. One or more non-transitory computer-readable media storing program executable by one or more processing units of a computing system to cause the computing system to perform operations comprising:

determining, for each of a plurality of different types of requests, a sequence in which services of a service system are executed in response to the request;

generating a directed graph based on the sequences, where each vertex of the directed graph represents a respective service of the services;

generating a flow network graph by replacing each vertex of the directed graph with two vertices and a directed edge between the two vertices, and associating the directed edge with a capacity of the service represented by the replaced vertex;

determining a maximum flow through the service system based on the flow network graph;

determining a residual capacity of each service of the service system based on the maximum flow into each service and the capacity of each service;

determining, based on the determined residual capacities, one or more services associated with a zero residual capacity and having an upstream service in one of the sequences with a non-zero residual capacity; and increase computing resources available to the determined one or more services.

16. The one or more non-transitory computer-readable media of claim 15, the operations further comprising:

determining a second one or more services associated with a non-zero residual capacity based on the determined residual capacities; and decreasing computing resources available to the second one or more services associated with a non-zero residual capacity.

17. The one or more non-transitory computer-readable media of claim 16, wherein determining the maximum flow through the service system comprises:

identifying a first path of services from a source of the flow network graph to a sink of the flow network graph;

determining a first minimum capacity of the services of the first path;

associating a first flow with the services of the first path based on the first minimum capacity;

for each service of the first path, subtracting the first minimum capacity from the capacity of the service and assignment of the difference as the residual capacity of the service;

identifying a second path of services from the source of the flow network graph to the sink of the flow network graph;

determining a second minimum capacity of the services of the second path;

associating a second flow with the services of the second path based on the second minimum capacity; and for each service of the second path, subtracting the second minimum capacity from the capacity of the service associated and assignment of the difference as the residual capacity of the service.

18. The one or more non-transitory computer-readable media of claim 17, wherein determining the maximum flow through the service system comprises:

identifying a third path of services from the source of the flow network graph to the sink of the flow network graph, wherein a service of the third path is also a service of the first path;

determining a third minimum capacity of the services of the third path;

for the service of the third path which is also a service of the first path, determining that a first flow associated with the service of the third path is less than the third minimum capacity; and in response to determining that the flow associated with the service of the third path is less than the third minimum capacity:

associating the third minimum capacity with the service of the third path; and subtracting a difference between the third minimum capacity and the first minimum capacity from the assigned residual capacity of the service of the third path.

19. The one or more non-transitory computer-readable media of claim 15, wherein determining the maximum flow through the service system comprises:

identifying a first path of services from a source of the flow network graph to a sink of the flow network graph;

determining a first minimum capacity of the services of the first path;

associating a first flow with the services of the first path based on the first minimum capacity;

for each service of the first path, subtracting the first minimum capacity from the capacity of the service and assignment of the difference as the residual capacity of the service;

identifying a second path of services from the source of the flow network graph to the sink of the flow network graph;

determining a second minimum capacity of the services of the second path;

associating a second flow with the services of the second path based on the second minimum capacity;

for each service of the second path, subtracting the second minimum capacity from the capacity of the service associated and assignment of the difference as the residual capacity of the service;

identifying a third path of services from the source of the flow network graph to the sink of the flow network graph, wherein a service of the third path is also a service of the first path;

determining a third minimum capacity of the services of the third path;

for the service of the third path which is also a service of the first path, determining that a flow associated with the service of the third path is less than the third minimum capacity; and in response to determining that the flow associated with the service of the third path is less than the third minimum capacity:

associating the third minimum capacity with the service of the third path; and subtracting a difference between the third minimum capacity and the first minimum capacity from the assigned residual capacity of the service of the third path.

20. The one or more non-transitory computer-readable media according to claim 15, wherein the capacities of two or more of the services are different.

* * * * *